United States Patent
Glover et al.

(10) Patent No.: US 12,018,169 B2
(45) Date of Patent: Jun. 25, 2024

(54) TWO-COMPONENT POLYURETHANE COMPOSITION

(71) Applicant: SIKA TECHNOLOGY AG, Baar (CH)

(72) Inventors: Stephen Glover, Chorley (GB); Alexander Coward, Sale (GB); Mark Gatrell, Preston (GB); Mike Byrne, Lytham (GB)

(73) Assignee: SIKA TECHNOLOGY AG, Baar (CH)

( * ) Notice: Subject to any disclaimer, the term of this patent is extended or adjusted under 35 U.S.C. 154(b) by 543 days.

(21) Appl. No.: 17/282,570

(22) PCT Filed: Dec. 18, 2019

(86) PCT No.: PCT/EP2019/085872
§ 371 (c)(1),
(2) Date: Apr. 2, 2021

(87) PCT Pub. No.: WO2020/127439
PCT Pub. Date: Jun. 25, 2020

(65) Prior Publication Data
US 2021/0340402 A1 Nov. 4, 2021

(30) Foreign Application Priority Data

Dec. 20, 2018 (EP) .................................. 18214524

(51) Int. Cl.
| | | |
|---|---|---|
| *C09D 175/14* | (2006.01) | |
| *C08G 18/08* | (2006.01) | |
| *C08G 18/10* | (2006.01) | |
| *C08G 18/24* | (2006.01) | |
| *C08G 18/42* | (2006.01) | |
| *C08G 18/67* | (2006.01) | |
| *C08G 18/73* | (2006.01) | |
| *C08J 7/04* | (2020.01) | |
| *E04B 1/66* | (2006.01) | |
| *E04D 5/10* | (2006.01) | |
| *E04F 15/16* | (2006.01) | |

(52) U.S. Cl.
CPC ....... *C09D 175/14* (2013.01); *C08G 18/0852* (2013.01); *C08G 18/10* (2013.01); *C08G 18/246* (2013.01); *C08G 18/42* (2013.01); *C08G 18/6755* (2013.01); *C08G 18/73* (2013.01); *C08J 7/0427* (2020.01); *E04B 1/665* (2013.01); *E04D 5/10* (2013.01); *E04F 15/16* (2013.01); *C08J 2323/00* (2013.01); *C08J 2327/06* (2013.01); *C08J 2375/02* (2013.01); *C08J 2375/04* (2013.01); *C08J 2475/14* (2013.01)

(58) Field of Classification Search
None
See application file for complete search history.

(56) References Cited

U.S. PATENT DOCUMENTS

| | | | | |
|---|---|---|---|---|
| 3,904,796 A | * | 9/1975 | Zorn | ............... C14C 11/006 |
| | | | | 524/390 |
| 2007/0160851 A1 | * | 7/2007 | Barancyk | ............. C09D 175/02 |
| | | | | 528/68 |
| 2018/0002479 A1 | | 1/2018 | Mager et al. | |
| 2018/0171174 A1 | * | 6/2018 | Schaefer | ............... C08G 18/792 |

FOREIGN PATENT DOCUMENTS

| | | |
|---|---|---|
| CN | 106459345 A | 2/2017 |
| CN | 107207697 A | 9/2017 |
| EP | 2 808 354 A1 | 12/2014 |
| JP | H07-90015 A | 4/1995 |
| JP | H10-106295 A | 4/1998 |
| JP | 2004-346321 A | 12/2004 |
| JP | 2017-512243 A | 5/2017 |
| JP | WO2016/199792 A1 | 4/2018 |
| JP | 2019-99597 A | 6/2019 |

OTHER PUBLICATIONS

Feb. 6, 2020 Search Report issued in International Patent Application No. PCT/EP2019/085872.
Feb. 6, 2020 Written Opinion of the International Searching Authority issued in International Patent Application No. PCT/EP2019/085872.

* cited by examiner

*Primary Examiner* — Jeffrey D Washville
(74) *Attorney, Agent, or Firm* — Oliff PLC

(57) ABSTRACT

A multi-component composition contains a) a polyol component having a1) acrylate polyol and a2) at least one of polyester polyol and polyether polyol, wherein the equivalent ratio of hydroxyl groups of acrylate polyol to hydroxyl groups of the at least one of polyester polyol and polyether polyol is in the range of 0.4 to 3.8, and b) an isocyanate component containing b1) aliphatic polyisocyanate monomer, dimer and/or trimer, and b2) aliphatic polyisocyanate prepolymer, wherein the equivalent ratio of isocyanate groups of aliphatic polyisocyanate monomer, dimer and/or trimer to isocyanate groups of aliphatic polyisocyanate prepolymer is in the range of 0.5 to 2.6. The multi-component composition is suitable for use as a top coat on elastic membranes, in particular roofing membranes, to provide sufficient weathering resistance/protection.

17 Claims, No Drawings

TWO-COMPONENT POLYURETHANE COMPOSITION

TECHNICAL FIELD

The invention relates to a multi-component polyurethane composition, in particular a two-component polyurethane composition, suitable as top coat over polymeric membranes, especially for roofing, waterproofing or flooring applications.

BACKGROUND OF THE INVENTION

In particular in the field of roofing, membranes such as polyurethane/polyurea hybrid membranes have been introduced which are based on two-component coating compositions containing aromatic material and are applied in liquid form on the basic structure, in particular by spraying. These membranes are usually not UV stable and only available in a single colour shade. The market has therefore requested a thin applied UV resistant/stable top coat that can be produced in a wide range of colours.

UV curable acrylic coating compositions were tested as top coats over said membranes but found not suitable because adhesion failures were found on extended field exposure.

Currently, one-component, moisture curing polyurethanes such as Sikalastic®-445 or Sikalastic®-621 from Sika AG, Switzerland, are used as top coat over polyurethane/polyurea hybrid membranes. The state of the art solution in the market is a thin applied UV protective top coat with an application rate of max. 200-300 ml/m².

Other membranes used e.g. in roofing such as standard hand applied polyurea, two component standard self-levelling polyurethanes, PVC membranes, and FPO membranes suffer on esthetical issues caused by discoloration, or change of colour of the installed roofing membrane. There is also a need for suitable top coats to solve said esthetical issues.

A known solution is a particular water-based two-component polyurethane composition containing PVC plasticiser (Sikagard®-950 from Knuchel Farben, Switzerland), which is used as top coat for this type of application, but also to create logos and graphics on roofs with polymeric membranes. This solution is however not suitable for large surface application due to the high product costs.

Two-component polyurethane coatings having a polyol component based on acrylate polyols and an isocyanate component based on aliphatic isocyanate monomers are known from the automotive industry as protective top coats for cars. These compositions are however not suitable for elastic substrates (expand upon temperature difference) as membranes and floors/roofs since they are too brittle.

SUMMARY OF THE INVENTION

The object of the invention was to provide a top coating composition with enough flexibly and adhesion to the mentioned elastic substrates/membranes, in particular roofing membranes, in order to provide sufficient weathering resistance/protection. The coating composition should also enable preparation of top coats in a wide range of colours.

It was found that the multi-component composition according to claim 1 fulfils this object and has additional advantages. Accordingly, the invention provides a multi-component composition containing a) a polyol component comprising
  a1) acrylate polyol and
  a2) at least one of polyester polyol and polyether polyol,
    wherein the equivalent ratio of hydroxyl groups of acrylate polyol to hydroxyl groups of the at least one of polyester polyol and polyether polyol is in the range of 0.4 to 3.8, and
b) an isocyanate component containing
  b1) aliphatic polyisocyanate monomer, dimer and/or trimer, and
  b2) aliphatic polyisocyanate prepolymer,
    wherein the equivalent ratio of isocyanate groups of aliphatic polyisocyanate monomer, dimer and/or trimer to isocyanate groups of aliphatic polyisocyanate prepolymer is in the range of 0.5 to 2.6.

The addition of polyester polyol and/or polyether polyol, in particular polyester polyol, as well as the addition of aliphatic polyisocyanate prepolymer in the given proportions results in an increased flexibility, which is apparent from e.g. the tensile strength and elongation at break values of the coatings obtained.

Top coats prepared with the inventive multi-component composition show a number of favourable properties such as:
- high adhesion strength (initially and after long term exposure) on above mentioned substrates/membranes
- specific mechanical properties:
  - high tensile strength, e.g. higher than 8 MPa (RT and −20° C.)
  - high elongation at break, e.g. higher than 100%
- good gloss and UV retention
- color retention
- no cracking
- low chalking
- high Solar Reflectance Index (SRI) in RAL 9016, e.g. initial>110 and after weathering>90 (determined according to ASTM 1980)
- good hiding power at application rate of 200-300 ml/m²
- low soiling and easy cleanable
- good chemical resistance Other aspects of the invention are revealed in other independent claims. Preferred aspects of the invention are revealed in the dependent claims.

DETAILED DESCRIPTION OF THE INVENTION

In this application, substance names starting with "poly", such as polyol or polyisocyanate, refer to substances carrying two or more of the respective functional groups (OH groups in the case of polyol) per molecule.

In this application, an isocyanate is called "aliphatic" when its isocyanate group is directly bound to an aliphatic, cycloaliphatic or arylaliphatic moiety. An isocyanate is called "aromatic" when its isocyanate group is directly bound to an aromatic moiety.

In this application, "room temperature" (RT) refers to a temperature of ca. 23° C.

In this application, the term "average molecular weight" refers to the number-average molecular weight ($M_n$) (d50 value) of an oligomeric or polymeric compound having a certain molecular weight distribution as determined by GPC (gel permeation chromatography).

As is known by the skilled person, the isocyanate content or NCO content refers to weight percent of free isocyanate groups based on the weight of the compound or polymer/prepolymer and can be determined as usual, e.g. by a titration method.

The multi-component composition according to the invention contains a) a polyol component, and b) an isocyanate component. In general, the inventive multi-component composition is preferably a two-component composition consisting of a) the polyol component, and b) the isocyanate component. There may be cases, where one or even more further components are included such as a colouring component containing pigments. However, coloring agents such pigments can also be included in the polyol component. Thus, a wide range of colours is available for the top coat The a) polyol component comprises a1) acrylate polyol and a2) at least one of polyester polyol and polyether polyol. It is particularly preferred that the at least one of polyester polyol and polyether polyol is polyester polyol, i.e. the polyol component comprises a1) acrylate polyol and a2) polyester polyol.

In the polyol component, the equivalent ratio of hydroxyl groups of acrylate polyol to hydroxyl groups of the at least one of polyester polyol and polyether polyol is in the range of 0.4 to 3.8, preferably 0.5 to 3.6, more preferably 0.6 to 3.4, wherein the at least one of polyester polyol and polyether polyol is preferably polyester polyol.

In the isocyanate component, the equivalent ratio of isocyanate groups of aliphatic polyisocyanate monomer, dimer and/or trimer to isocyanate groups of aliphatic polyisocyanate prepolymer is in the range of 0.5 to 2.6, preferably 0.7 to 2.1, 0.8 to 2.0, 1.0 to 2.0, 1.1 to 2.0, more preferably 1.2 to 2.0.

The at least one of polyester polyol and polyether polyol has an average molecular weight in the range of 900 to 1100 g/mol, preferably 950 to 1000 g/mol, wherein the at least one of polyester polyol and polyether polyol is preferably polyester polyol.

The polyol component comprises one or more acrylate polyols. Acrylate polyol improves weathering resistance and glass retention. The acrylate polyol is preferably a polyacrylate polyol and/or a polymethacrylate polyol. Polyacrylate polyols and polymethacrylate polyols are e.g. obtainable by polymerisation of at least one alkyl acrylate and/or alkyl methacrylate with at least one hydroxyl functional alkyl acrylate and/or hydroxyl functional alkyl methacrylate.

Preferably, the acrylate polyol, in particular polyacrylate polyol or polymethacrylate polyol, has a hydroxyl value of 116 g/mol or more. In addition, it is preferred when the hydroxyl value of the polyacrylate polyol or polymethacrylate polyol is not more than 130 g/mol. The average molecular weight of the acrylate polyol, in particular polyacrylate polyol or polymethacrylate polyol, may be, for instance, in the range of 900 to 1100 g/mol, preferably 950 to 1000 g/mol.

The polyol component comprises one or more polyester polyols and/or one or more polyether polyols, preferably one or more polyester polyols. The polyester polyol is e.g. polyester diol, polyester triol or a mixture thereof, in particular polyester diol. Suitable polyester polyols are e.g. amorphous, semicrystalline or crystalline polyester polyols which are liquid at 25° C., such as polyester triols and especially polyester diols, and mixtures of these polyester polyols.

Polyester polyol are e.g. obtainable by polycondensation reaction of diols and/or triols with lactones or dicarboxylic acids or their esters or anhydrides. Further examples of suitable polyester polyols are polyester polyols of oleochemical origin. Polyester polyols of this kind may be prepared, for example, by complete ring opening of epoxidized triglycerides of a fat mixture comprising at least partly olefinically unsaturated fatty acid, with one or more alcohols having 1 to 12 C atoms, and by subsequent partial transesterification of the triglyceride derivatives to give alkyl ester polyols having 1 to 12 C atoms in the alkyl radical.

The polyester polyol, e.g., polyester triol and especially polyester diol, preferably has an average molecular weight of 900 to 1100 g/mol, more preferably 950 to 1000 g/mol.

An example for a suitable commercial polyester polyol is Desmophen® 670 BA (OH equivalent weight of 485, solid content 80%) from Covestro.

Polyether polyols also called polyoxyalkylene polyols, or oligoetherols, are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as, for example, water, ammonia, or compounds with several OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Suitable examples of polyetherpolyols are polyoxyethylenepolyols, polyoxypropylenepolyols and polyoxybutylenepolyols, in particular polyoxyethylenediols, polyoxypropylenediols, polyoxybutylenediols, polyoxyethylenetriols and polyoxypropylenetriols. Further examples of polyetherpolyols are so-called ethylene oxide-terminated ("EO-endcapped", ethylene oxide-end-capped) polyoxypropylenepolyols, or styrene-acrylonitrile-grafted polyetherpolyols.

Preferred examples of a polyether diol are a polyoxyethylenediol, a polyoxypropylenediol, and a polyoxybutylenediol. Preferred examples of a polyether triol are a polyoxyethylenetriol and a polyoxypropylenetriol or a EO-endcapped polyoxypropylenetriol.

The polyols, in particular the polyether diols and polyether triols, may have, e.g. an average molecular weight in the range of 900 to 1100 g/mol, preferably 950 to 1000 g/mol.

The isocyanate component comprises one or more aliphatic polyisocyanate monomers, dimers and/or trimers. The aliphatic polyisocyanate may be e.g. diisocyanate, triisocyanate or higher polyisocyanate, preferably aliphatic diisocyanate. As is known by the skilled person, aliphatic polyisocyanates may be in present as monomers, dimers or trimers, or mixtures thereof.

Examples of suitable aliphatic polyisocyanates are 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane, and any mixtures of these isomers (HTDI or H6TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or H12MDI), 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3- and -1,4-xylylenediisocyanate (m- and p-TMXDI), bis-(1-isocyanato-1-methyl-ethyl)-naphthalene, dimer- and trimer fatty acid isocyanates such as 3,6-bis-(9-isocyanatononyl)-4,5-di-(1-heptenyl)-cyclohexene (dimeryl diisocyanate), α,α,α',α',α'',α''-hexamethyl-1,3,5-mesitylene triisocyanate, dimers and trimers of the above-mentioned aliphatic polyisocyanate monomers, as well as any mixtures of the above-mentioned isocyanates.

The aliphatic polyisocyanate monomer, dimer and/or trimer is preferably selected from monomer, dimer or trimer of HDI or IPDI such as HDI monomer, IPDI monomer, HDI biuret, HDI uretdione, HDI trimer or IPDI trimer. Examples for suitable commercial aliphatic polyisocyanates are Tolonate® HDT LV (aliphatic HDI trimer, NCO content 23%, NCO equivalent weight 183) from Vencorex, or Desmodur® N3300 (aliphatic HDI trimer, NCO content 21.8%, NCO equivalent weight 193) from Bayer.

The isocyanate component further comprises one or more aliphatic polyisocyanate prepolymers. The term prepolymer here generally refers to oligomers or polymers which are used as intermediate products for producing polymers with higher molecular weight.

The aliphatic polyisocyanate prepolymer is generally an isocyanate-functional, in particular an isocyanate-terminated, urethane prepolymer. As is known by the skilled person, such isocyanate-terminated urethane prepolymer is typically obtained by reacting at least one aliphatic polyisocyanate, preferably an aliphatic diisocyanate, and at least one polyol, such as at least one diol and/or at least one triol. Examples of suitable polyols are polyetherpolyols, polyesterpolyols, polycarbonatepolyols, poly(meth)acrylate polyols, polyhydrocarbon-polyols, polyhydroxy-functional acrylonitrile/butadiene copolymers and mixtures thereof, wherein the polyol is preferably polyester polyol. Examples of suitable aliphatic polyisocyanates as well as polyester polyols and polyether polyols for the prepolymer are those mentioned above to which reference is made.

The aliphatic polyisocyanate prepolymer is preferable an ester group containing aliphatic polyisocyanate prepolymer, in particular an ester group containing isocyanate-functional, in particular isocyanate-terminated, urethane prepolymer. The aliphatic polyisocyanate prepolymer is preferably a reaction product of aliphatic polyisocyanate such as HDI or IPDI, and polyester polyol.

In a suitable embodiment, the aliphatic polyisocyanate prepolymer or isocyanate-functional, in particular isocyanate-terminated, urethane prepolymer, preferably the ester group containing aliphatic polyisocyanate prepolymer, in particular the ester group containing isocyanate-functional, in particular isocyanate-terminated, urethane prepolymer has e.g. an isocyanate content of 10.00% to 12.00%, preferably 10.80% to 11.20%.

An example for suitable commercial aliphatic polyisocyanate prepolymer is Desmodur® E2863XP (ester group containing prepolymer based on HDI, NCO content 11%, NCO equivalent weight 380) from Bayer.

The NCO index of the multi-component composition, i.e. the stoichiometric ratio of isocyanate (NCO) groups to the hydroxyl (OH) groups in the multi-component composition in percent may be adjusted in the suitable limits as is known by the skilled person. The NCO index may be, for instance, in the range of 90% to 110%, preferably 95% to 105%.

The polyol component preferably comprises one or more organic solvents. Examples for suitable organic solvents are esters such as n-butyl acetate, ether esters such as methoxypropyl acetate, ketones, aliphatic or aromatic hydrocarbons, such as xylene and toluene, and chlorinated hydrocarbons.

The polyol component may contain one or more further additives. Such additives are commonly used, if desired, and typically known to the persons skilled in the art. Examples of optional further additives are plasticizers, fillers such as silica or fumed silica, pigments such titanium dioxide, catalysts such as organotin compounds or aliphatic or aromatic amines, adhesion promoters, such as silanes, stabilizers against heat light and UV radiation, thixotropic agents, flow improving additives, flame retardants, surface active agents such as defoamers, wetting agents, flow control agents, biocides, emulsifiers, and mixtures thereof. Preferably, one or more additives selected from organic solvent, fillers, pigment, UV-stabilizers, catalysts are included in the polyol component.

The isocyanate component may optionally comprise one or more further additives such as those mentioned above, e.g. solvents, if at all, usually in relatively small amounts, e.g. up to 20 or up to 10 wt. % of the additives all together.

The invention also relates to a method for preparing a coated substrate, comprising
  i) mixing the components of the inventive multi-component composition as defined, preferably of the inventive two-component composition, to obtain a mixture,
  ii) applying the mixture on the substrate, and
  iii) allowing the applied mixture to cure to obtain a top coat on the substrate.

The substrate is preferably a polymer substrate. The substrate is preferably a membrane, in particular a polymer membrane. Preferably, the substrate is selected from elastic polymer substrate, in particular elastic polymer membrane. In a preferred embodiment, the substrate has been obtained by applying a coating composition such as a polyurethane composition or polyurethane/polyurea hybrid composition in liquid form on a basic structure such as a concrete structure or s steel structure.

In particular, the substrate is selected from a polyurethane, polyurea, polyurethane/polyurea hybrid, polyvinyl chloride (PVC) or flexible polyolefin (FPO) substrate, wherein the substrate is preferably a membrane. The adhesion of the inventive multi-component composition such as those described in the examples below, on said substrates has been tested and found to be satisfactory.

Before applying the mixture on the substrate according to step (ii), the substrate may be provided with a primer coating. For instance, a PVC substrate or a FPO substrate is preferably provided with a primer, after which the mixture is applied thereon according to step (ii).

The substrate is preferably part of a roofing, waterproofing or flooring system, preferably part of a roofing system. The substrate is preferably a roofing membrane. In particular, the substrate is selected from a polyurethane, polyurea, polyurethane/polyurea hybrid, PVC or FPO substrate or membrane, respectively.

The thickness of the top coat obtained by the inventive method may be adjusted according to the needs. For instance, the top coat may have a thickness in the range of 100 to 250 µm, preferably 175 to 225 µm.

The method of the invention provides a top coat having enough flexibly and adhesion to the substrates, in particular those substrates mentioned above, in order to provide sufficient weathering resistance/protection.

The invention also relates to a coated substrate, obtainable by the inventive method described above.

The invention also relates to the use of a multi-component composition according to the invention as top coating for a substrate, wherein the substrate is preferably part of a roofing, waterproofing or flooring system. The substrate is preferably a roofing membrane. In particular, the inventive multi-component composition is suitable as a weathering resistant top coating.

The following examples are presented to further illustrate and explain the present invention and should not be taken as limiting in any regard.

EXAMPLES

The following materials were used in the examples:

| Type | Material |
|---|---|
| solvent | methoxypropylacetate (MPA) |
| acrylate polyol | Joncryl ® 507 from BASF, solid content 80%, solvent butyl acetate, OH equivalent weight 401 |
| polyester polyol | Desmophen ® 670 BA from Covestro, OH equivalent weight 485 |
| antioxidant | Univul 3035 |
| levelling agent | Efka SL3236 |
| defoamer | Afcona 2290 |
| dispersing agent | Tego Dispers 652 |
| HALS | Tinuvin 292, a liquid hindered amine light stabilizer |
| UV absorber | Tinuvin 400 |
| catalyst | Tinstab BL277, dibutyltindilaurate (DBTL) |
| $TiO_2$ | Kronos 2310 |
| silica | fumed silica |
| ATH | aluminium trihydroxide (ATH) |
| HDI | Tolonate ®HDT LV from Vencorex, HDI trimer, NCO content 23%, NCO equivalent weight 183 |
| HDI prepolymer | Desmodur ® E 2863 XP from Bayer, ester group containing prepolymer based on HDI, NCO content 11%, NCO equivalent weight 380 |

Examples 1 to 6

Two-component compositions were prepared, wherein the ratio of acrylate polyol and polyester polyol was varied. Table 1 shows the ingredients and proportions used. All examples were adjusted in order to achieve an NCO index of 95% in each case. Table 2 shows the resulting NCO and OH equivalents and equivalent ratios, namely the equivalent ratio of hydroxyl groups of acrylate polyol (AP) to hydroxyl groups of polyester polyol (PP) (equivalent ratio OH(AP)/ OH (PP)) and the equivalent ratio of isocyanate groups of HDI trimer (HDI) to isocyanate groups of HDI prepolymer (HDI prepolymer) (equivalent ratio NCO(HDI)/NCO (HDI prepolymer)). Top coats obtained by applying and curing the respective two-component compositions on a substrate were assessed with the following test methods. Tables 3 and 4 show the results obtained.

Tensile Strength (TS) and Elongation at Break (EB)

According to BS EN ISO 527-3—specimen type: bar shaped, at 23° C. According to technical requirements, the following values are preferable TS>6.0 N/mm², EB>100%

Mechanical Properties after Heat Ageing at 80° C.

The top-coated substrates were stored for 28 days at 80° C. Thereafter, tensile strength (TS(ageing)) and elongation at break (EB(ageing)) were determined and the reduction of TS and EB compared to the values before heat ageing calculated (TS(reduction) and EB(reduction)). According to technical requirements, the following values are preferable: <20% tensile strength reduction and <20% elongation reduction.

Mechanical Properties after Hydrolysis at 70° C.

The top-coated substrates were immersed in water at 70° C. for 28 days.

Thereafter, tensile strength (TS(hydrolysis)) and elongation at break (EB(hydrolysis)) were determined and the reduction of TS and EB compared to the values before hydrolysis calculated (TS(reduction) and EB(reduction)). According to technical requirements, the following values are preferable: <20% tensile strength reduction and <20% elongation reduction.

Gloss Retention

Gloss reading (60°) on the top-coated substrates during accelerated UVB exposure up to 5000 hours at predetermined periods.

QUVB

QUVB Accelerated Weathering after 5,000 hours of UVB exposure according to ASTM G154. The properties of the top coat is assessed after exposure. Desired properties are: No embrittlement, discolouration, cracking/crazing or other defects.

TABLE 1

| Material type | Ex. 1 wt. % | Ex. 2* wt. % | Ex. 3 wt. % | Ex. 4 wt. % | Ex. 5 wt. % | Ex. 6* wt. % |
|---|---|---|---|---|---|---|
| polyol component | | | | | | |
| solvent | 24.00 | 24.00 | 24.00 | 24.00 | 24.00 | 24.00 |
| acrylate polyol | 31.64 | 44.45 | 33.34 | 22.23 | 11.11 | 0.00 |
| polyester polyol | 12.81 | 0.00 | 11.11 | 22.23 | 33.34 | 44.45 |
| antioxidant | 0.22 | 0.22 | 0.22 | 0.22 | 0.22 | 0.22 |
| levelling agent | 0.30 | 0.30 | 0.30 | 0.30 | 0.30 | 0.30 |
| defoamer | 0.50 | 0.50 | 0.50 | 0.50 | 0.50 | 0.50 |
| dispersing agent | 0.50 | 0.50 | 0.50 | 0.50 | 0.50 | 0.50 |
| HALS | 0.58 | 0.58 | 0.58 | 0.58 | 0.58 | 0.58 |
| UV absorber | 0.56 | 0.56 | 0.56 | 0.56 | 0.56 | 0.56 |
| catalyst | 0.04 | 0.04 | 0.04 | 0.04 | 0.04 | 0.04 |
| TiO2 | 20.00 | 20.00 | 20.00 | 20.00 | 20.00 | 20.00 |
| silica | 1.50 | 1.50 | 1.50 | 1.50 | 1.50 | 1.50 |
| ATH | 7.35 | 7.35 | 7.35 | 7.35 | 7.35 | 7.35 |
| isocyanate component | | | | | | |
| HDI | 47.62 | 47.62 | 47.62 | 47.63 | 47.62 | 47.61 |
| HDI prepolymer mixture | 52.38 | 52.38 | 52.38 | 52.37 | 52.38 | 52.39 |
| polyol component | 79.87 | 79.09 | 79.87 | 80.48 | 81.23 | 82.00 |
| isocyanate component | 20.13 | 20.91 | 20.13 | 19.52 | 18.77 | 18.00 |

*Reference examples

TABLE 2

| | Ex. 1 | Ex. 2* | Ex. 3 | Ex. 4 | Ex. 5 | Ex. 6* |
|---|---|---|---|---|---|---|
| acrylate polyol (AP) equivalents OH | 0.0789 | 0.1108 | 0.0831 | 0.0554 | 0.0277 | 0 |
| equivalents OH in % | 74.92 | 100 | 78.40 | 54.74 | 28.73 | 0 |
| polyester polyol (PP) equivalents OH | 0.0264 | 0 | 0.0229 | 0.0458 | 0.0687 | 0.0916 |
| equivalents OH in % | 25.08 | 0 | 21.60 | 45.26 | 71.27 | 100 |
| equivalent ratio OH(AP)/OH (PP) | 2.99 | — | 3.63 | 1.21 | 0.40 | 0 |
| HDI equivalents NCO | 0.0656 | 0.0688 | 0.0656 | 0.0631 | 0.0601 | 0.0571 |
| equivalents NCO in % | 65.37 | 65.37 | 65.37 | 65.38 | 65.37 | 65.36 |
| HDI prepolymer equivalents NCO | 0.0347 | 0.0364 | 0.0347 | 0.0334 | 0.0318 | 0.0303 |
| equivalents NCO in % | 34.63 | 34.63 | 34.63 | 34.62 | 34.63 | 34.64 |
| equivalent ratio NCO(HDI)/NCO (HDI prepolymer) | 1.89 | 1.89 | 1.89 | 1.89 | 1.89 | 1.89 |

*Reference examples

TABLE 3

| | Ex. 1 | Ex. 2* | Ex. 3 | Ex. 4 | Ex. 5 | Ex. 6* |
|---|---|---|---|---|---|---|
| TS [N/mm²] | 11.04 | 35.05 | 12.50 | 8.24 | 5.64 | 4.98 |
| EB [%] | 112 | 6 | 95 | 145 | 168 | 189 |
| Mechanical Properties after Heat Ageing @ 80° C. | | | | | | |
| TS (ageing) [N/mm²] | 10.98 | 37.12 | 12.62 | 8.54 | 6.25 | 5.68 |
| TS (reduction) [%] | −0.54 | 5.91 | 0.96 | 3.64 | 10.82 | 14.06 |
| EB (ageing) [%] | 109 | 5 | 93 | 134 | 147 | 162 |
| EB (reduction) [%] | −2.68 | −16.67 | −2.11 | −7.59 | −12.50 | −14.29 |
| Mechanical Properties after Hydrolysis @ 70° C. | | | | | | |
| TS (hydrolysis) [N/mm²] | 10.87 | 39.24 | 12.24 | 7.98 | 5.45 | 4.78 |
| TS (reduction) [%] | −1.54 | 11.95 | −2.08 | −3.16 | −3.37 | −4.02 |
| EB (hydrolysis) [%] | 107 | 3 | 89 | 129 | 142 | 165 |
| EB (reduction) [%] | −4.46 | −50.00 | −6.32 | −11.03 | −15.48 | −12.70 |
| Gloss retention | | | | | | |
| Initial | 88.0 | 87.2 | 86.2 | 88.5 | 89.2 | 87.5 |
| 500 Hours | 79.8 | 81.1 | 78.8 | 74.5 | 72.2 | 71.5 |
| 1000 Hours | 78.9 | 78.2 | 77.5 | 71.2 | 63.5 | 60.9 |
| 1500 Hours | 78.1 | 77.4 | 77.1 | 64.4 | 51.2 | 46.2 |
| 2000 Hours | 77.7 | 77.8 | 75.6 | 53.6 | 43.5 | 32.7 |
| 2500 Hours | 77.2 | 77.1 | 76.4 | 47.8 | 31.8 | 17.2 |
| 3000 Hours | 75.3 | 76.5 | 77.2 | 35.7 | 16.5 | 8.2 |

TABLE 4

| | QUVB* |
|---|---|
| Ex. 1 | no yellowing or discolouration |
| Ex. 2** | no yellowing or discolouration but brittle film |
| Ex. 3 | no yellowing or discolouration |
| Ex. 4 | some yellowing |
| Ex. 5 | some yellowing |
| Ex. 6** | some yellowing |

*Film discolouration (yellowing) increases on increase of Desmophen 670 BA
**Reference examples Examples 7 to 11

Two-component compositions were prepared, wherein the ratio of aliphatic isocyanate and aliphatic isocyanate prepolymer was varied. Table 5 shows the ingredients and proportions used. All examples were adjusted in order to achieve an NCO index of 95% in each case. Table 6 shows the resulting NCO and OH equivalents and equivalent ratios. Top coats obtained by applying and curing the respective two-component compositions on a substrate were assessed with the test methods described above. Tables 7 and 8 show the results obtained. Example 1 explained above is included in all Tables for comparison.

TABLE 5

| Material type | Ex. 1 wt. % | Ex. 7* wt. % | Ex. 8* wt. % | Ex. 9 wt. % | Ex. 10 wt. % | Ex. 11* wt. % |
|---|---|---|---|---|---|---|
| polyol component | | | | | | |
| solvent | 24.00 | 24.00 | 24.00 | 24.00 | 24.00 | 24.00 |
| acrylate polyol | 31.64 | 31.64 | 31.64 | 31.64 | 31.64 | 31.64 |
| polyester polyol | 12.81 | 12.81 | 12.81 | 12.81 | 12.81 | 12.81 |
| antioxidant | 0.22 | 0.22 | 0.22 | 0.22 | 0.22 | 0.22 |
| levelling agent | 0.30 | 0.30 | 0.30 | 0.30 | 0.30 | 0.30 |
| defoamer | 0.50 | 0.50 | 0.50 | 0.50 | 0.50 | 0.50 |
| dispersing agent | 0.50 | 0.50 | 0.50 | 0.50 | 0.50 | 0.50 |
| HALS | 0.58 | 0.58 | 0.58 | 0.58 | 0.58 | 0.58 |
| UV absorber | 0.56 | 0.56 | 0.56 | 0.56 | 0.56 | 0.56 |
| catalyst | 0.04 | 0.04 | 0.04 | 0.04 | 0.04 | 0.04 |
| TiO2 | 20.00 | 20.00 | 20.00 | 20.00 | 20.00 | 20.00 |
| silica | 1.50 | 1.50 | 1.50 | 1.50 | 1.50 | 1.50 |
| ATH | 7.35 | 7.35 | 7.35 | 7.35 | 7.35 | 7.35 |
| isocyanate component | | | | | | |
| HDI | 47.62 | 100 | 75 | 50 | 25 | 0 |
| HDI prepolymer mixture | 52.38 | 0 | 25 | 50 | 75 | 100 |
| polyol component | 79.87 | 84.46 | 82.64 | 80.13 | 76.92 | 72.46 |
| isocyanate component | 20.13 | 15.54 | 17.36 | 19.87 | 23.08 | 27.54 |

*Reference examples

TABLE 6

| | Ex. 1 | Ex. 7* | Ex. 8* | Ex. 9 | Ex. 10 | Ex. 11* |
|---|---|---|---|---|---|---|
| acrylate polyol (AP) equivalents OH | 0.0789 | 0.0789 | 0.0789 | 0.0789 | 0.0789 | 0.0789 |
| equivalents OH in % | 74.92 | 74.92 | 74.92 | 74.92 | 74.92 | 74.92 |
| polyester polyol (PP) equivalents OH | 0.0264 | 0.0264 | 0.0264 | 0.0264 | 0.0264 | 0.0264 |
| equivalents OH in % | 25.08 | 25.08 | 25.08 | 25.08 | 25.08 | 25.08 |
| equivalent ratio | 2.99 | 2.99 | 2.99 | 2.99 | 2.99 | 2.99 |
| HDI equivalents NCO | 0.0656 | 0.1005 | 0.0861 | 0.0678 | 0.0410 | 0 |
| equivalents NCO in % | 65.37 | 100 | 86.17 | 67.50 | 40.90 | 0 |
| HDI prepolymer equivalents NCO | 0.0347 | 0 | 0.0138 | 0.0326 | 0.0592 | 0.1000 |
| equivalents NCO in % | 34.63 | 0 | 13.83 | 32.50 | 59.10 | 100 |
| equivalent ratio NCO(HDI)/NCO(HDI prepolymer) | 1.89 | — | 6.23 | 2.08 | 0.69 | 0 |

*Reference examples

TABLE 7

| | Ex. 1 | Ex. 7* | Ex. 8* | Ex. 9 | Ex. 10 | Ex. 11* |
|---|---|---|---|---|---|---|
| TS [N/mm$^2$] | 11.04 | 17.60 | 14.65 | 11.72 | 5.98 | 2.86 |
| EB [%] | 112 | 56 | 72 | 94 | 125 | 111 |
| Mechanical Properties after Heat Ageing @ 80° C. | | | | | | |
| TS (ageing) [N/mm$^2$] | 10.98 | 17.89 | 15.15 | 12.54 | 6.25 | 3.02 |
| TS (reduction) [%] | −0.54 | 1.65 | 3.41 | 7.00 | 4.52 | 5.59 |
| EB (ageing) [%] | 109 | 48 | 65 | 96 | 114 | 104 |
| EB (reduction) [%] | −2.68 | −14.29 | −9.72 | 2.13 | −8.80 | −6.31 |
| Mechanical Properties after Hydrolysis @ 70° C. | | | | | | |
| TS (hydrolysis) [N/mm$^2$] | 10.87 | 18.05 | 14.34 | 11.49 | 5.78 | 2.95 |
| TS (reduction) [%] | −1.54 | 2.56 | −2.12 | −1.96 | −3.34 | 3.15 |

TABLE 7-continued

|  | Ex. 1 | Ex. 7* | Ex. 8* | Ex. 9 | Ex. 10 | Ex. 11* |
|---|---|---|---|---|---|---|
| EB (hydrolysis) [%] | 107 | 45 | 63 | 88 | 116 | 107 |
| EB (reduction) [%] | −4.46 | −19.64 | −12.50 | −6.38 | −7.20 | −3.60 |

*Reference examples

TABLE 8

| QUVB | |
|---|---|
| Ex. 1 | no yellowing or discolouration |
| Ex. 7* | no yellowing or discolouration |
| Ex. 8* | no yellowing or discolouration |
| Ex. 9 | no yellowing or discolouration |
| Ex. 10 | no yellowing or discolouration |
| Ex. 11* | no yellowing or discolouration |

*Reference examples

Examples 12 to 15

Two-component compositions were prepared, wherein the NCO index was varied. Table 9 shows the ingredients and proportions used. Table 10 shows the resulting NCO and OH equivalents, equivalent ratios, and NCO index. Top coats obtained by applying and curing the respective two-component compositions on a substrate were assessed with the test methods described above. Tables 11 and 12 show the results obtained. Example 1 explained above is included in all Tables for comparison.

TABLE 9

| Material type | Ex. 1 wt. % | Ex. 12 wt. % | Ex. 13 wt. % | Ex. 14 wt. % | Ex. 15 wt. % |
|---|---|---|---|---|---|
| polyol component | | | | | |
| solvent | 24.00 | 24.00 | 24.00 | 24.00 | 24.00 |
| acrylate polyol | 31.64 | 31.64 | 31.64 | 31.64 | 31.64 |
| polyester polyol | 12.81 | 12.81 | 12.81 | 12.81 | 12.81 |
| antioxidant | 0.22 | 0.22 | 0.22 | 0.22 | 0.22 |
| levelling agent | 0.30 | 0.30 | 0.30 | 0.30 | 0.30 |
| defoamer | 0.50 | 0.50 | 0.50 | 0.50 | 0.50 |
| dispersing agent | 0.50 | 0.50 | 0.50 | 0.50 | 0.50 |
| HALS | 0.58 | 0.58 | 0.58 | 0.58 | 0.58 |
| UV absorber | 0.56 | 0.56 | 0.56 | 0.56 | 0.56 |
| catalyst | 0.04 | 0.04 | 0.04 | 0.04 | 0.04 |
| TiO2 | 20.00 | 20.00 | 20.00 | 20.00 | 20.00 |
| silica | 1.50 | 1.50 | 1.50 | 1.50 | 1.50 |
| ATH | 7.35 | 7.35 | 7.35 | 7.35 | 7.35 |
| isocyanate component | | | | | |
| HDI | 47.62 | 47.63 | 47.62 | 47.62 | 47.63 |
| HDI prepolymer | 52.38 | 52.37 | 52.38 | 52.38 | 52.37 |
| mixture | | | | | |
| polyol component | 79.87 | 80.37 | 79.08 | 78.19 | 77.48 |
| isocyanate component | 20.13 | 19.27 | 20.92 | 21.81 | 22.52 |

TABLE 10

| | Ex. 1 | Ex. 12 | Ex. 13 | Ex. 14 | Ex. 15 |
|---|---|---|---|---|---|
| acrylate polyol (AP) | | | | | |
| equivalents OH | 0.0789 | 0.0789 | 0.0789 | 0.0789 | 0.0789 |
| equivalents OH in % | 74.92 | 74.92 | 74.92 | 74.92 | 74.92 |
| polyester polyol (PP) | | | | | |
| equivalents OH | 0.0264 | 0.0264 | 0.0264 | 0.0264 | 0.0264 |
| equivalents OH in % | 25.08 | 25.08 | 25.08 | 25.08 | 25.08 |
| equivalent ratio OH(AP)/OH(PP) | 2.99 | 2.99 | 2.99 | 2.99 | 2.99 |
| HDI | | | | | |
| equivalents NCO | 0.0656 | 0.0621 | 0.0689 | 0.0726 | 0.0756 |
| equivalents NCO in % | 65.37 | 65.38 | 65.37 | 65.37 | 65.38 |
| HDI prepolymer | | | | | |
| equivalents NCO | 0.0347 | 0.0329 | 0.0365 | 0.0384 | 0.0401 |
| equivalents NCO in % | 34.63 | 34.62 | 34.63 | 34.63 | 34.62 |
| equivalent ratio NCO(HDI)/NCO (HDI prepolymer) | 1.89 | 1.89 | 1.89 | 1.89 | 1.89 |
| NCO index in % | 95 | 90 | 100 | 105 | 110 |

TABLE 11

| | Ex. 1 | Ex. 12 | Ex. 13 | Ex. 14 | Ex. 15 |
|---|---|---|---|---|---|
| TS [N/mm$^2$] | 11.04 | 11.22 | 10.87 | 10.34 | 10.22 |
| EB [%] | 112 | 105 | 114 | 117 | 124 |
| Mechanical Properties after Heat Ageing @ 80° C. | | | | | |
| TS(ageing) [N/mm$^2$] | 10.98 | 11.11 | 10.71 | 10.23 | 10.02 |
| TS (reduction) [%] | −0.54 | −0.98 | −1.47 | −1.06 | −1.96 |
| EB(ageing) [%] | 109 | 100 | 109 | 111 | 115 |
| EB(reduction) [%] | −2.68 | −4.76 | −4.39 | −5.13 | −7.26 |
| Mechanical Properties after Hydrolysis a 70° C. | | | | | |
| TS(hydrolysis) [N/mm$^2$] | 10.87 | 11.05 | 10.69 | 10.15 | 9.87 |
| TS (reduction) [%] | −1.54 | −1.52 | −1.66 | −1.84 | −3.42 |
| EB(hydrolysis) [%] | 107 | 98 | 106 | 107 | 112 |
| EB(reduction) [%] | −4.46 | −6.67 | −7.02 | −8.55 | −9.68 |

TABLE 12

| | QUVB |
|---|---|
| Ex. 1 | no yellowing or discolouration |
| Ex. 12 | no yellowing or discolouration |
| Ex. 13 | no yellowing or discolouration |
| Ex. 14 | no yellowing or discolouration |
| Ex. 15 | no yellowing or discolouration |

The invention claim is:

1. A multi-component composition containing
   a) a polyol component comprising
      a1) acrylate polyol and
      a2) at least one of polyester polyol and polyether polyol,
   wherein the equivalent ratio of hydroxyl groups of acrylate polyol to hydroxyl groups of the at least one of polyester polyol and polyether polyol is in the range of 0.4 to 3.8, and
   b) an isocyanate component containing
      b1) aliphatic polyisocyanate monomer, dimer and/or trimer, and
      b2) aliphatic polyisocyanate prepolymer,
   wherein the equivalent ratio of isocyanate groups of aliphatic polyisocyanate monomer, dimer and/or trimer to isocyanate groups of aliphatic polyisocyanate prepolymer is in the range of 0.5 to 2.6.

2. The multi-component composition according to claim 1, wherein a2) the at least one of polyester polyol and polyether polyol is polyester polyol.

3. The multi-component composition according to claim 1, wherein the equivalent ratio of hydroxyl groups of acrylate polyol to hydroxyl groups of the at least one of polyester polyol and polyether polyol is in the range of 0.5 to 3.6, and/or
   wherein the equivalent ratio of isocyanate groups of aliphatic polyisocyanate monomer, dimer and/or trimer to isocyanate groups of aliphatic polyisocyanate prepolymer is in the range of 0.7 to 2.1.

4. The multi-component composition according to claim 1, wherein the at least one of polyester polyol and polyether polyol has an average molecular weight in the range of 900 to 1100 g/mol.

5. The multi-component composition according to claim 1, wherein acrylate polyol is one or more polyacrylate polyols and/or one or more polymethacrylate polyols.

6. The multi-component composition according to claim 1, wherein
   aliphatic polyisocyanate monomer, dimer and/or trimer is monomer, dimer and/or trimer of HDI or IPDI, and/or
   aliphatic polyisocyanate prepolymer is an isocyanate-functional urethane prepolymer.

7. The multi-component composition according to claim 1, wherein the NCO index of the multi-component composition is in the range of 90 to 110%.

8. The multi-component composition according to claim 1, wherein the polyol component comprises one or more organic solvents.

9. A method for preparing a coated substrate, comprising
   i) mixing the components of a multi-component composition according to claim 1, to obtain a mixture,
   ii) applying the mixture on the substrate, and
   iii) allowing the applied mixture to cure to obtain a top coat on the substrate.

10. The method of claim 9, wherein the substrate is a membrane.

11. The method of claim 9, wherein the substrate is a polyurethane, polyurea, polyurethane/polyurea hybrid, polyvinyl chloride (PVC) or flexible polyolefin (FPO) substrate or membrane.

12. The method according to claim 9, wherein the substrate is part of a roofing, waterproofing or flooring system.

13. A coated substrate, obtainable by a method according to claim 9.

14. A method comprising applying a multi-component composition according to claim 1, as top coating for a substrate, wherein the substrate is part of a roofing, waterproofing or flooring system.

15. The method according to claim 14, wherein the composition is applied as a weathering resistant top coating.

16. The multi-component composition according to claim 1, wherein the aliphatic polyisocyanate monomer, dimer and/or trimer is a monomer, dimer and/or trimer of HDI, and wherein the aliphatic polyisocyanate prepolymer is a prepolymer of HDI.

17. The multi-component composition according to claim 16, wherein the equivalent ratio of isocyanate groups of aliphatic polyisocyanate monomer, dimer and/or trimer to isocyanate groups of aliphatic polyisocyanate prepolymer is in the range of 0.7 to 2.1.

* * * * *